US012263418B2

(12) United States Patent
Heuberger et al.

(10) Patent No.: US 12,263,418 B2
(45) Date of Patent: Apr. 1, 2025

(54) ROTARY EVAPORATOR

(71) Applicant: Hans Heidolph GmbH, Kelheim (DE)

(72) Inventors: Sven Heuberger, Nuremberg (DE); Robert Loschel, Schwabach (DE)

(73) Assignee: Hans Heidolph GmbH, Kelheim (DE)

( * ) Notice: Subject to any disclaimer, the term of this patent is extended or adjusted under 35 U.S.C. 154(b) by 165 days.

(21) Appl. No.: 17/668,637

(22) Filed: Feb. 10, 2022

(65) Prior Publication Data

US 2022/0266165 A1   Aug. 25, 2022

Related U.S. Application Data

(62) Division of application No. 16/634,950, filed as application No. PCT/EP2018/070774 on Jul. 31, 2018, now Pat. No. 11,273,387.

(30) Foreign Application Priority Data

Aug. 1, 2017   (DE) ..................... 20 2017 004 053.0

(51) Int. Cl.
| | | |
|---|---|---|
| B01D 3/08 | (2006.01) | |
| B01D 1/00 | (2006.01) | |
| B01D 1/22 | (2006.01) | |
| B01D 3/10 | (2006.01) | |
| B01D 3/42 | (2006.01) | |
| B01D 5/00 | (2006.01) | |

(52) U.S. Cl.
CPC ............ *B01D 1/222* (2013.01); *B01D 1/0082* (2013.01); *B01D 3/085* (2013.01); *B01D 3/10* (2013.01); *B01D 3/42* (2013.01); *B01D 5/006* (2013.01); *B01D 5/0096* (2013.01)

(58) Field of Classification Search
CPC . B01D 3/085; B01D 3/10; B01D 3/12; B01D 3/42
See application file for complete search history.

(56) References Cited

U.S. PATENT DOCUMENTS

| | | | |
|---|---|---|---|
| 4,759,825 | A | 7/1988 | Medvey et al. |
| 5,611,895 | A | 3/1997 | Genser |

(Continued)

FOREIGN PATENT DOCUMENTS

| | | |
|---|---|---|
| CN | 101330950 A | 12/2008 |
| CN | 202087335 U | 12/2011 |

(Continued)

OTHER PUBLICATIONS

International Search Report issued in PCT/EP2018/070774, dated Sep. 17, 2018.
Chinese Office Action dated Apr. 30, 2021.

*Primary Examiner* — Jonathan Luke Pilcher
(74) *Attorney, Agent, or Firm* — Troutman Pepper Locke LLP; Scott D. Wofsy; Gabrielle L. Gelozin

(57) ABSTRACT

A rotary evaporator for evaporating a substance contained in an initial substance comprises an evaporation flask (2) for receiving the initial substance, a device (3) for heating the substance, a condenser (4) for condensing the vaporized substance, a collection container (6) for receiving the re-liquefied substance and at least one device (5) for generating a low pressure and/or an excess pressure. In order to remove the re-liquefied substance an excess pressure can be generated at least within the collection container (6) and/or in order to remove residues of the initial substance an excess pressure can be generated at least within the evaporation flask (2).

12 Claims, 4 Drawing Sheets

(56) References Cited

U.S. PATENT DOCUMENTS

2009/0165653 A1    7/2009   Torii et al.
2013/0153397 A1    6/2013   Carl et al.

FOREIGN PATENT DOCUMENTS

| CN | 203208697 U | 9/2013 |
| --- | --- | --- |
| CN | 203447781 U | 2/2014 |
| CN | 205055453 U | 3/2016 |
| CN | 106512448 A | 3/2017 |
| CN | 206081696 U | 4/2017 |
| DE | 35 22 607 A1 | 1/1987 |
| DE | 35 26 644 C2 | 6/1989 |
| DE | 44 05 717 C1 | 6/1995 |
| EP | 2606949 A1 | 6/2013 |
| JP | 2009262055 A | 11/2009 |

ROTARY EVAPORATOR

CROSS-REFERENCE TO RELATED APPLICATIONS

This application is a Divisional of U.S. patent application Ser. No. 16/634,950, filed on Jan. 29, 2020, which is a U.S. 371 National Phase Application of International PCT Patent Application No. PCT/EP2018/070774, filed on Jul. 31, 2018, which application claims priority to German Patent Application No. 20 2017 004 053.0, filed on Aug. 1, 2017. The contents of these applications are incorporated herein by reference in their entirety.

The present invention relates to a rotary evaporator for evaporating a substance contained in an initial substance.

A rotary evaporator comprises a rotary flask for receiving an initial substance containing the substance to be evaporated. The rotary flask is heated by heating in a heating bath and the substance to be evaporated is converted into the vapor phase. Through a vapor passage, the vapor gets in a condenser where it cools and condenses. The distillate thus obtained is then removed from a collection container.

Such a rotary evaporator is known for example from document DE 44 05 717 C1. In order to remove the distillate, a pressure relief valve and an excess pressure generator that increases the pressure in the distillate are provided. At a sufficiently large overpressure of the distillate the pressure relief valve opens and releases distillate to a storage container.

The disadvantage here is that a pressure is generated in the distillate itself in order to remove the distillate. This can result in a contamination of the distillate or affect physical properties of the same. In addition, the distillate is only removed at a sufficient excess pressure, as a result of which residues of the distillate can remain in the collection container.

It is therefore an object of the present invention to provide a rotary evaporator by which removal of the distillate or of residues of the initial substance is possible in a simple manner and/or cleaning of which is possible in a simple manner.

This object is achieved by a rotary evaporator, a rotary evaporator, a method for evaporating a substance contained in an initial substance and a method for cleaning a rotary evaporator according to the claims, and as described herein. Further developments of the invention are given in the dependent claims. The features of the rotary evaporators and of the methods can also be used among each other for further development and the methods can also be further developed by the features of the rotary evaporator given below and in the dependent claims, and vice versa.

A rotary evaporator according to a first aspect of the invention is suited for evaporating a substance contained in an initial substance and comprises an evaporation flask for receiving the initial substance, a device for heating the substance, a condenser for condensing the vaporized substance, a collection container for receiving the re-liquefied substance and at least one device for generating a low pressure and/or an excess pressure. For the purpose of removing the re-liquefied substance an excess pressure can be generated at least within the collection container and/or for the purpose of removing residues of the initial substance an excess pressure can be generated at least within the evaporation flask.

Here, the term "substance" or "material" is to be understood as meaning both pure substances and mixtures which can be present in the liquid and/or solid phase. The vaporized substance can comprise all or only one or more than one components of the initial substance and after evaporation it is present in the gas phase. In the following it is also referred to as distillate.

Here, the term "excess pressure" or "overpressure" means that there is a pressure within the respective container that is higher than the pressure in an external space into which the distillate or residues of the initial substance are discharged. For example, this external space can be another closed container having a defined pressure or an open container in which atmospheric pressure prevails.

Such a rotary evaporator makes it possible, for example, to remove the distillate or a non-evaporated rest of the initial substance from the respective container in a simple manner. In doing so, an excess pressure is generated in the container, which excess pressure displaces the substance from the container. Thus, no pressure is generated in the substance itself.

Preferably, a low pressure can be generated at least within the evaporation flask for the purpose of supplying the initial substance in a metered manner. Here, the term "low pressure" or "negative pressure" means that in the evaporation flask a pressure, up to a vacuum, prevails that is lower than the pressure in an external space from which the initial substance is supplied. This external space can be, for example, another closed container with a defined pressure or an open container in which atmospheric pressure prevails. By means of said supply of the initial substance in a metered manner by means of a low pressure, it is possible, for example, to introduce the initial substance into the evaporation flask in a simple manner, because the initial substance is sucked into the evaporation flask due to the low pressure.

Preferably, at least the evaporation flask, the condenser and the collection container form a substantially gas-tight sealed system in which preferably a pressure can be adjusted by means of the device for generating a low and/or excess pressure. In this way, for example, the low and/or excess pressure can be generated in a simple manner. Since in a rotary evaporator the distillation process usually takes place under low pressure, generation of a reduced or excess pressure in the evaporation flask and/or in the collection container is possible, for example, by using devices that are already present, so that no complicated and/or expensive modifications of the rotary evaporator are necessary.

Furthermore, the rotary evaporator preferably comprises a first conduit for supplying the initial substance in a metered manner and/or a second conduit for removing the re-liquefied substance and/or a third conduit for removing the initial substance, wherein the first, second and third conduits have first, second and third shut-off devices respectively, so that the second and third conduits can be shut off by the second and third shut-off devices in order to supply the initial substance in a metered manner and/or so that the first and third conduits can be shut off by the first and third shut-off devices in order to remove the re-liquefied substance and/or so that the first and second conduits can be shut off by the first and second shut-off devices in order to remove the initial substance. By means of this, the individual processes of removal and/or the metered supply can be implemented separately from one another, for example.

Preferably, the initial substance is a substance mixture of different components and preferably at least two first conduit portions are provided in order to supply the initial substance in a metered manner, wherein preferably shut-off devices are provided at and/or between the conduit portions in order to meter different components of the initial substance. As a result, for example, the components of the initial substance can be introduced separately metered into the evaporation flask, so that the mixture of substances is produced in the flask itself, i.e. is mixed within the flask. Separate introduction of the individual components can take place consecutively or simultaneously in time. The metered amount is defined, for example, by the volume flow rate of the individual components and the duration of the flow. The metered amount can be controlled, for example, by the shut-off devices.

Preferably, at least one shut-off device can be operated manually and/or automatically and/or is suitable for metering an amount of the substance flowing there through. This makes it possible, for example, to set the amount of initial substance to be supplied. It is also possible, for example, to implement automatic removal of the distillate and/or of the initial substance and/or to implement automatic metered supply. For this purpose, sensors can be provided in the respective containers and/or conduits, for example.

The initial substance is preferably a substance mixture of at least two components, one component being present in the liquid phase or gas phase or solid phase. As described above, in such a rotary evaporator such a mixture of substances, in particular if the components have different phases, can be mixed in a simple manner within the evaporation flask and does not need to be already present as a prepared mixture, for example. In doing so, in particular solids such as a powder can be mixed with liquids such as a solvent, for example. In doing so, it is also possible, for example, to introduce a gas into a liquid as an initial substance.

Preferably, at least two distillate removal containers and/or at least two second conduit portions are provided in the rotary evaporator in order to remove at least two different components of the re-liquefied substance. This makes it possible, for example, to remove different fractions of the distillate separately.

Preferably, a first conduit and/or a first conduit portion for supplying the initial substance in a metered manner is at least temporarily connected with a distillate removal container. This makes it possible, for example, to carry out multiple distillation in a simple manner and/or at least partially automatically.

Preferably, the rotary evaporator is connected to at least one storage container for storing at least one component of the initial substance, and to a metering device, preferably a peristaltic pump, for supplying a predetermined amount of the at least one component of the initial substance from the storage container into a metering container. This makes it possible, for example, to set the amount of the initial substance or of the individual initial substance components to be supplied to the evaporation flask. The storage container and the metering device can also be part of the rotary evaporator.

Furthermore, a control unit for an above-described rotary evaporator is preferably provided, the control unit being configured and/or programmed to control shut-off devices of the rotary evaporator and/or the device for generating a low and/or excess pressure in order to provide for an automatic supply of the initial substance in a metered manner and/or for an automatic removal of residues of the initial substance and/or for an automatic removal of the re-liquefied substance. This allows, for example, for implementation of an at least partially automatic distillation process.

A rotary evaporator according to a further aspect of the invention is suitable for evaporating a substance contained in an initial substance and comprises an evaporation flask for receiving the initial substance, a device for heating the substance, a condenser for condensing the vaporized substance, an optional collection container for receiving the re-liquefied substance and at least one device for generating a low pressure and/or an excess pressure. For the purpose of removing a cleaning agent, in particular a liquid cleaning agent, an excess pressure can be generated at least within the evaporation flask and/or the condenser.

By means of such a rotary evaporator it is possible, for example, to remove a cleaning agent from the evaporation flask and/or the condenser in a simple manner. In doing so, an excess pressure is generated in the evaporation flask and/or the condenser, which excess pressure displaces the cleaning agent from the container, i.e. from the evaporation flask and/or the condenser. In particular, this makes it possible, for example, to remove a cleaning agent without the need for a further cleaning device provided separately from the rotary evaporator, such as an external pump for removing the cleaning agent from the evaporation flask and/or the condenser of the rotary evaporator by means of suction.

Preferably, a low pressure can be generated at least in the evaporation flask and/or the condenser for the purpose of supplying the cleaning agent. By such a supply of the cleaning agent by means of low pressure it is possible, for example, to introduce the cleaning agent into the evaporation flask in a simple manner, since the cleaning agent is sucked into the evaporation flask or the condenser by the low pressure. In particular, this makes it possible, for example, to easily introduce a cleaning agent for cleaning the rotary evaporator by means of low pressure (e.g. from a cleaning agent supply provided) and to remove it again by means of excess pressure (and, for example, to supply it to a cleaning agent removal container), and thus to carry out cleaning of the rotary evaporator essentially without additional means, i.e. in particular without a separately provided pump and/or further pressure generating means (with the exception of any containers for the cleaning agent and/or supply or discharge lines for the cleaning agent).

According to the invention, a first method is provided for evaporating a substance contained in an initial substance using a rotary evaporator. The rotary evaporator comprises an evaporation flask for receiving the initial substance, a device for heating the substance, a condenser for condensing the vaporized substance, a collection container for receiving the re-liquefied substance and at least one device for generating a low pressure and/or an excess pressure. In this method, an excess pressure is generated at least within the collection container in order to remove the re-liquefied substance and/or an excess pressure is generated at least within the evaporation flask in order to remove residues of the initial substance. With such a method it is possible, for example, to remove the distillate or a non-evaporated rest of the initial substance from the respective container in a simple manner. In doing so, an excess pressure is generated in the container, which excess pressure displaces the substance from the container. Hence, no excess pressure is generated in the substance itself.

The possibility of producing mixtures of substances by separate introduction of the components into the evaporation flask in particular opens up a wide range of possible applications for such a rotary evaporator, such as for the production of medicines, for the production of slurries in ceramics production or for powder production, for example for use in injection moulding processes.

According to the invention, a further method is provided that serves for cleaning a rotary evaporator, i.e. a cleaning method for a rotary evaporator. The rotary evaporator comprises an evaporation flask for receiving the initial substance, a device for heating the substance, a condenser for condensing the vaporized substance, an optional collection container for receiving the re-liquefied substance and at least one device for generating a low pressure and/or an excess pressure. In the method an excess pressure is generated at least within the evaporation flask and/or in the condenser in order to remove a cleaning agent. With such a method it is possible, for example, to easily remove the cleaning agent from the evaporation flask and/or the condenser. In doing so, an overpressure is generated in the container (i.e. the evaporation flask and/or the condenser) which displaces the cleaning agent from the container. In particular, this makes it possible, for example, to remove a cleaning agent without a further cleaning device provided separately from the rotary evaporator, such as an external pump for removing the cleaning agent from the evaporation flask and/or the condenser of the rotary evaporator by suction.

Preferably, a low pressure is generated at least in the evaporation flask and/or the condenser in order to supply the cleaning agent. This makes possible, for example, to introduce the cleaning agent into the evaporation flask in a simple manner, since the low pressure sucks the cleaning agent into the evaporation flask and/or the condenser.

Further features and expediencies of the invention will become apparent from the description of exemplary embodiments with the aid of the attached drawings.

FIG. 1 shows a schematic depiction of an embodiment of a rotary evaporator according to the present invention.

FIG. 2a schematically shows an arrangement for supplying, in a metered manner, several components of an initial substance.

FIG. 2b shows a further development of the arrangement shown in FIG. 2a.

Figure 1:
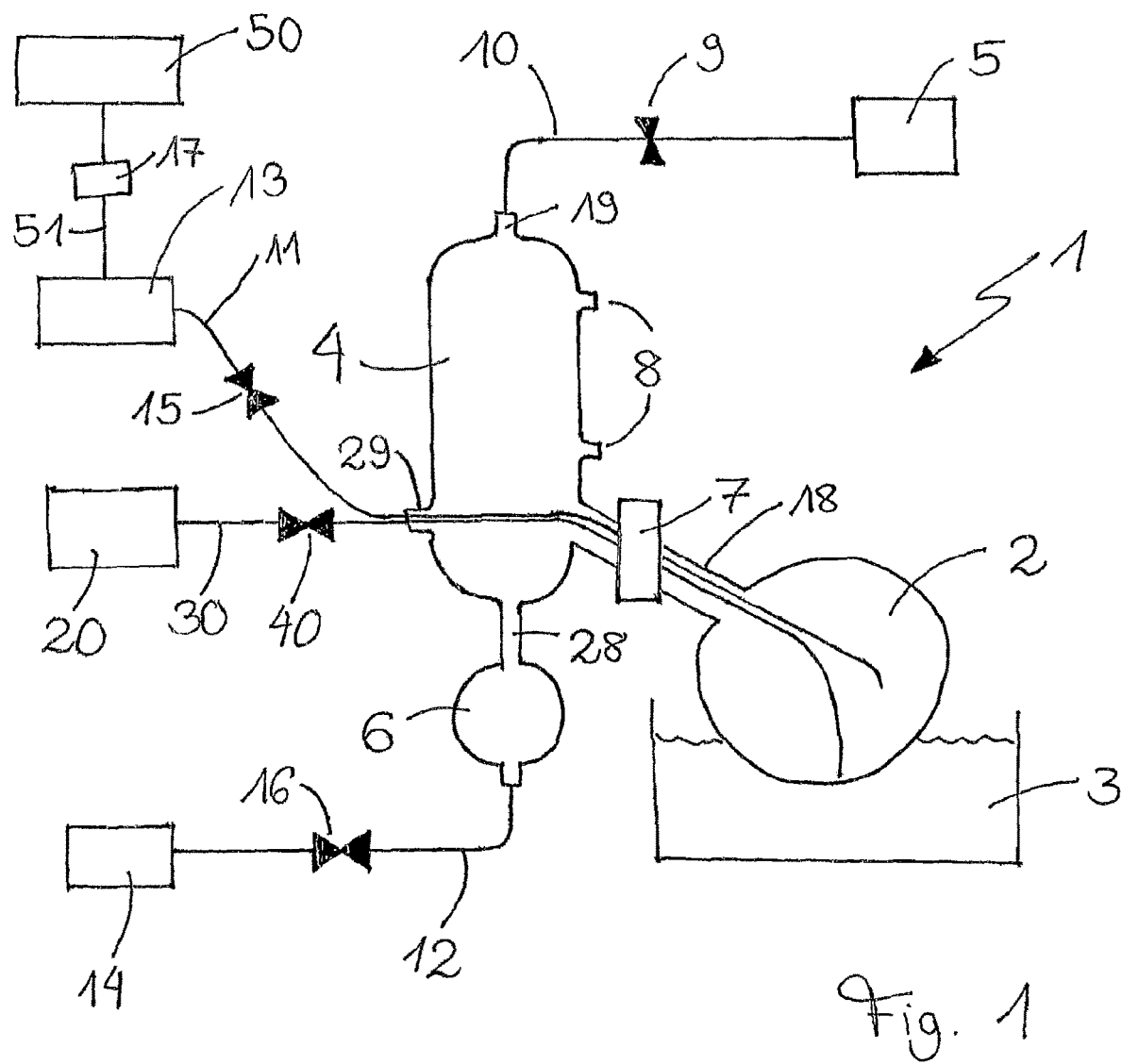

In the following, an embodiment of a rotary evaporator 1 according to the present invention is described with reference to FIG. 1.

The rotary evaporator 1 comprises an evaporation flask 2 for receiving an initial substance, which evaporation flask is arranged in a heating bath 3 and is rotatable about an axis of rotation by means of a rotary drive 7. Via a supply conduit 11, the evaporation flask 2 is connected with a container 13 containing the initial substance. Optionally, this container 13 can be connected via a conduit 51, which has a peristaltic pump 17, to a storage container 50. The evaporation flask 2 is in connection with a residue container 20 via a removal conduit 30. A vapor path is formed by a vapor passage 18 through the rotary drive 7 and a condenser 4. Below the condenser, a collection container 6 is provided for receiving liquefied distillate, which collection container is connected via a distillate conduit 12 to a distillate removal container 14. A compressor 5 is connected to the condenser.

The evaporation flask 2 can be designed as a round-bottom flask made of glass, for example. The heating bath 3 having a heatable liquid, e.g. water, is arranged below the evaporation flask 2. The immersion depth of the evaporation flask 2 in the liquid of the heating bath 3 can be adjusted by means of a vertical drive not shown in FIG. 1. The initial substance can be a pure substance or a mixture and is present in the liquid and/or solid phase in the evaporation flask 2 and contains the substance to be evaporated. The supply conduit 11 for supplying the initial substance in a metered manner connects the evaporation flask 2 with the container 13 and has a shut-off device in the form of a valve 15. The valve 15 is configured to open the supply conduit 11 so that an exchange of substances between the container 13 and the evaporation flask 2 is possible, and to shut off the supply conduit 11 so that no exchange of substances takes place. The valve 15 can be operated electrically, magnetically, pneumatically, hydraulically, mechanically and/or manually. Optionally, the valve can also be suitable for adjusting the volume flow rate through the supply conduit 11. A further conduit 51 connects the storage container 50 with the container 13 and has a metering device in the form of a peristaltic pump 17. The removal conduit 30 for removing rests and/or residues of the initial substance connects the evaporation flask 2 with the residue container 20 and has a shut-off device in the form of a valve 40. The valve 40 is configured to open the removal conduit 30 so that an exchange of substances between the evaporation flask 2 and the residue container 20 is possible, and to shut off the removal conduit 30 so that no exchange of substances takes place. The valve 40 can be operated electrically, magnetically, pneumatically, hydraulically, mechanically and/or manually. The removal conduit 30 preferably leads substantially down to the bottom, i.e. the lowest point, of the evaporation flask 2. This makes it possible to remove a predominant part of the initial substance residues, preferably the entire initial substance residues, from the evaporation flask 2, so that the evaporation flask can be emptied substantially completely.

The condenser 4 has coolant connections 8 for supplying and discharging of a coolant as well as a low pressure connection 19 that is connected to a compressor 5 via a conduit 10 and a valve 9. The compressor 5 is suitable for generating an excess pressure and for generating low pressure up to a vacuum. The condenser 4 further has a passage 29 for the supply conduit 11 and the removal conduit 30. It is also possible to provide two separate passages for the conduits 11 and 30. The distillate collection container 6 is arranged below the condenser 4 and connected to it via a distillate outlet 28. A distillate conduit 12 with a valve 16 connects the distillate collection container 6 with the distillate removal container 14. The valve 16 is configured to open the distillate conduit 12 so that an exchange of substances between the collection container 6 and the distillate removal container 14 is possible, and to shut off the distillate conduit 12 so that no exchange of substances takes place. The valve 16 can be operated electrically, magnetically, pneumatically, hydraulically, mechanically and/or manually. Optionally, it can be suitable for adjusting the volume flow rate through the distillate conduit 12.

Preferably, the evaporation flask 2, the condenser 4 and the collection container 6 with the elements arranged in the vapor path between them form a gas-tight sealed system.

Furthermore, the rotary evaporator comprises an operating unit not shown in FIG. 1 for controlling the rotary drive 7, the heating bath 3, the compressor 5, the vertical drive and the valves 9, 15, 16, 40 as well as the peristaltic pump 17. In particular the valves 9, 15, 16, 40 and the peristaltic pump 17 can also be controlled in a coordinated manner by a control unit (not shown in FIG. 1).

In operation, first the evaporation flask is filled. For doing so, a defined amount of the initial substance is supplied to the container 13 from the storage container 50 through the conduit 51 by means of the peristaltic pump 17. The valve 16 for the distillate removal and the valve 40 for the removal of residues of the initial substance are closed, so that the distillate conduit 12 and the removal conduit 30 are shut off. Then, by means of the compressor 5, a low pressure up to a vacuum is generated in the closed system consisting of the evaporation flask 2, the condenser 4 and the collection container 6 and the valve 15 is opened. The low pressure sucks the initial substance out of the container 13 through the supply conduit 11 into the evaporation flask 2. After filling the evaporation flask, the valve 15 is closed and thus shuts off the supply conduit 11.

Then the evaporation flask 2 is caused to rotate by means of the rotary drive 7. The distillate is evaporated from the initial substance by immersion in the heating bath 3 and/or by applying a low pressure by means of which the boiling temperature of the distillate can be reduced. By rotating the evaporation flask 2, a thin film, e.g. a liquid film, of the initial substance is generated on its inner surface, so that the surface of the initial substance is increased and evaporation is accelerated. The vaporized distillate passes through the vapor passage 18 into the condenser 4, where it is cooled and condenses. The liquefied distillate flows through the outlet 28 into the collection container 6.

In order to remove the distillate from the collection container 6, an excess pressure is now generated in the collection container 6 by means of the compressor 5. Then the valve 16 is opened so that the liquefied distillate is displaced from the collection container by the excess pressure and flows through the distillate conduit 12 into the distillate removal container 14. In addition, by opening the valve 40, non-evaporated rests and/or residues of the initial substance can be removed from the evaporation flask 2. Since the excess pressure also acts in the evaporation flask 2, residues of the initial substance are displaced from said flask and pass through the removal conduit 30 into the residue container 20. In doing so, the removal of distillate and the removal of initial substance residues can be carried out simultaneously or successively by suitably opening and closing of the valves 40, 16 and are preferably carried out until substantially no distillate is left in the collection container 6 and substantially no residues are left in the evaporation flask 2.

Figure 2A:
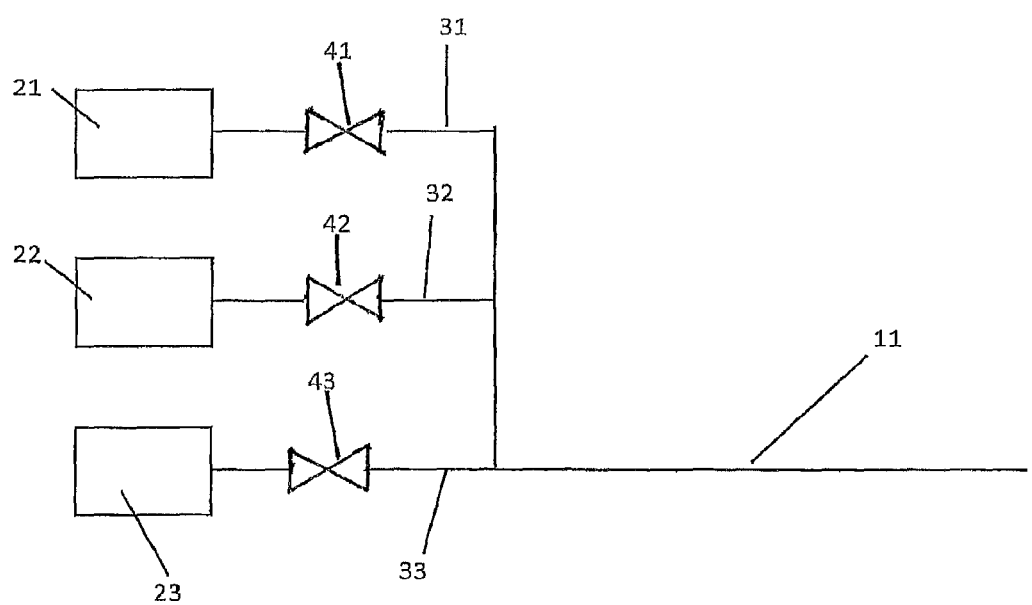

As shown in FIG. 2a, the evaporation flask 2 can also be connected to several containers 21, 22 and 23 for components of the initial substance. For this purpose, each of the containers 21, 22 and 23 is connected to the evaporation flask 2 via a separate conduit portion 31, 32 or 33 via the common supply conduit 11 so that a liquid and/or solid and/or gaseous substance can pass through the conduits. Furthermore, each conduit portion 31, 32 and 33 comprises a valve 41, 42 and 43 respectively.

The containers 21, 22 and 23 contain one component of the initial substance each. The initial substance components can be pure substances or also a mixture and are present in the liquid and/or solid and/or gas phase in the respective container. For example, the container 21 contains a first powder, the container 22 contains a second powder and the container 23 contains a solvent. The shut-off devices in the form of valves 41, 42 and 43 are configured to open the conduit portions 31, 32 and 33 respectively, so that an exchange of substances between the evaporation flask 2 and the respective container 21, 22 and 23 is possible, and to shut off the conduit portions 31, 32 and 33, so that no exchange of substances takes place. The valves 41, 42 and 43 can be operated electrically, magnetically, pneumatically, hydraulically, mechanically and/or manually. Preferably, they are suitable for adjusting the volume flow rate passing through the respective conduit portion. Optionally, the containers 21, 22, 23 can be connected to storage containers for the initial substance components via additional conduits and metering devices such as peristaltic pumps, similar to the container 13.

In order to fill the evaporation flask 2 a low pressure is generated within it as described above. In this process, the valve 40 of the removal conduit 30 connected to the residue container 20 and the valve 16 of the distillate conduit 12 are closed. By means of opening and closing the valves 41, 42 and 43 in a coordinated manner, metered supply of the desired initial substance into the evaporation flask is now effected, wherein by means of the low pressure the different components are transferred from the respective containers 21, 22 and 23 via the conduit portions 31, 32 and 33 into the supply conduit 11 and then into the evaporation flask 2. In doing so, the metered quantities of the components of the initial substance supplied from the containers 21, 22 and 23 are controlled by closing again the respective valves 41, 42 and 43 after a predetermined period of time and/or in that the valves allow predetermined quantities of the components to pass through the conduit portions 31, 32 and 33 and thus through the supply conduit 11. Optionally, the respective quantity of the initial substance component supplied in a metered manner can also be defined by the amount of the initial substance components contained in the respective containers 21, 22, 23. In doing so, the amount of each component supplied in a metered manner is determined by the composition and the total amount of the initial substance to be obtained. In doing so, the metered supply of the individual components into the evaporation flask can be carried out at least temporarily one after the other or simultaneously. The desired composition of the initial substance is thus obtained by mixing the initial substance components from the containers 21, 22 and 23, wherein the components can also chemically and/or physically interact with one another in the evaporation flask.

Optionally, the components can be additionally mixed with each other in the evaporation flask during or after their metered supply, for example by rotating and/or shaking the evaporation flask and/or by means of a further mixing device arranged in the evaporation flask. Additionally, thermal energy can also be added to the mixture, for example by increasing the temperature of the heating bath, so that, for example, chemical reactions or solution processes in the mixture are accelerated.

After filling the evaporation flask, the valves 41, 42 and 43 are closed. In order to remove rests and/or residues of the initial substance, an excess pressure is generated at least in the evaporation flask 2 as described above, which excess pressure displaces the initial substance residues from the flask and transfers them via the removal conduit 30 to the residue container 20 with the valve 40 being open. In the above-described example of an initial substance consisting of two powder components and a solvent, for example, the solvent can be substantially evaporated by the evaporation process so that after the evaporation process substantially a mixture of the two powder components is present in the evaporation flask as a residue of the initial substance and is supplied to the residue container 20.

In the above process, the valve 15 of the supply conduit 11 described with reference to FIG. 1 can be omitted, since the metered supply and the removal of the initial substance is controlled by the valves 41, 42 and 43.

Figure 2B:
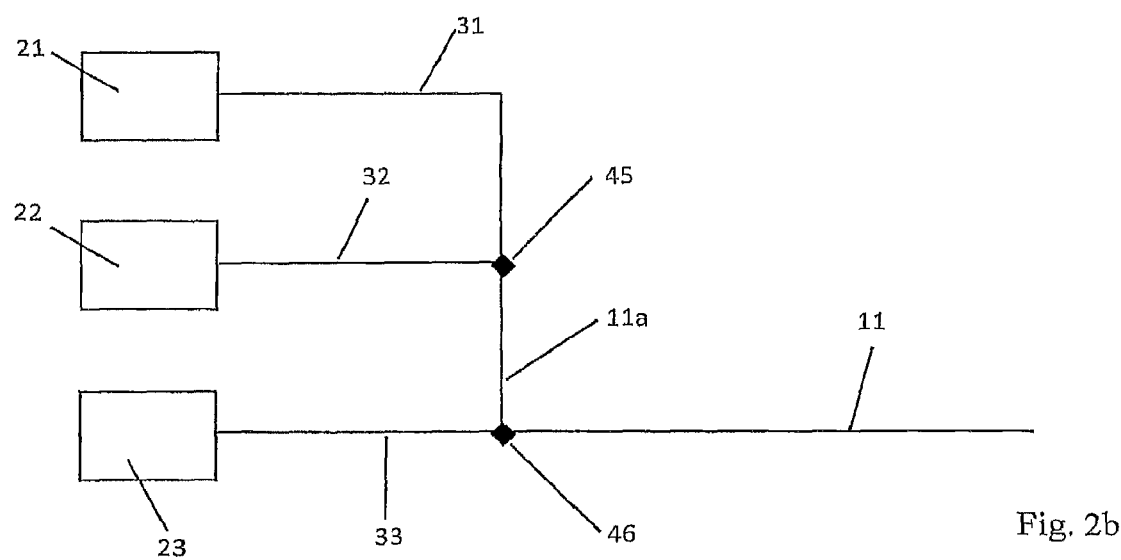

A further development of the invention is shown in FIG. 2b. Here the valves are not arranged in the conduit portions 41, 42 and 43 as shown in FIG. 2a, but at the junctions where the conduits branch. The shown valves 45 and 46 are suitable for controlling the flows of substances between the containers 21, 22 and 23 and the evaporation flask 2. Each of the valves 45 and 46 can be embodied as a 3/2-directional control valve, for example. Thus, the valve 46 controls the flow of substances between the supply conduit 11 and the conduit portions 11a and 33 and the valve 45 controls the flow of substances between the conduit portions 11a, 31 and 32.

The distillate can also be removed component by component. For this purpose, the fact that different components of the initial substance have different boiling points is taken advantage of. This makes it possible to evaporate different components of the initial substance at different times, transfer them into the collection container 6 and to remove them separately. For the removal of the individual components, several distillate removal containers can be provided, wherein one removal container each is connected to the distillate conduit 12 for receiving one distillate component.

Figure 3:
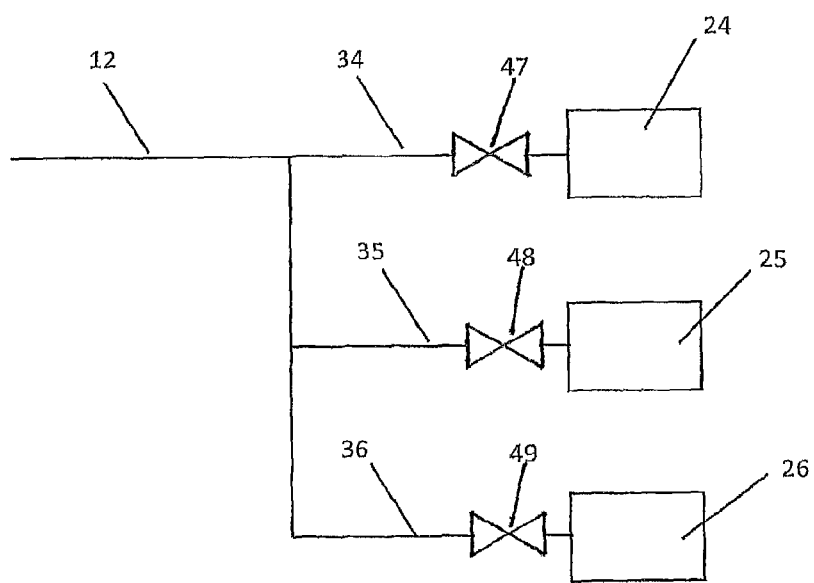
FIG. 3 shows a schematic arrangement for removing different components of a distillate.

As shown in FIG. 3, for the purpose of separate removal, conduit portions 34, 35 and 36 can also be provided, which conduit portions are connected to a distillate removal container 24, 25 and 26 respectively. For controlling the distillate flow from the collection container 6 into the desired removal container 24, 25 or 26 in a coordinated manner, shut-off devices in the form of valves 47, 48, 49 are provided in the respective conduit portions 34, 35 and 36. The valve 16 in the distillate conduit 12 can thus be omitted.

In order to remove three different distillate components, a first component is evaporated from the initial substance contained in the evaporation flask 2 by setting a suitable temperature in the heating bath 3 and/or a suitably low pressure in the evaporation flask 2 by means of the compressor 5 and/or a suitable rotational speed by means of the rotary drive 7. The vaporized component arrives at the condenser 4, there it is liquefied and passed into the collection container 6. By generating an excess pressure in the collection container 6, for example by means of the compressor 5, and opening the valve 47, the first distillate component is supplied via the distillate conduit 12 and the conduit portion 34 to the first distillate removal container 24. Then valve 47 is closed again.

Subsequently, by setting a suitable heating temperature and/or a suitably low pressure and/or a suitable rotational speed, a second component of the initial substance is evaporated, condensed and supplied to the collection container 6 and, by generating an excess pressure in the collection container 6 and opening the valve 48 of the conduit portion 35, this second distillate component is supplied to the second distillate removal container 25. Thereafter, the same is implemented for a third component that is supplied to the third distillate removal container 26.

In a further development of the invention at least one distillate removal container is connected to the supply conduit 11. This makes it possible to supply a removed distillate or distillate component to the evaporation flask again and to subject it to an evaporation process. Thus a multiple distillation process is possible in a simple manner.

In the above-described embodiment of the invention, for the purpose of distillate removal or removal of initial substance residues or metered supply of the initial substance, an excess pressure or a low pressure is generated in the entire system consisting of the collection container, the evaporation flask and the condenser, which system is sealed substantially gas-tight. For this purpose, the compressor 5 can be used and/or a further device for generating a low pressure and/or an excess pressure can be connected to connection 19 of the evaporator. Thus, devices which are already present at the rotary evaporator can be used to carry out the invention without having to make complex modifications to the rotary evaporator. However, it is also possible to connect a separate device for generating low and/or excess pressure to the evaporation flask or the distillate collection container. For this purpose, the respective container has suitable connections and can preferably be decoupled from the gas-tight system by means of a valve provided in the vapor passage 18 or the distillate outlet 28, i.e. by closing the valve in the vapor passage 18 or the distillate outlet 28 the evaporation flask or the distillate collection container is a substantially gas-tight sealed space in which a defined pressure can be generated by means of the device for generating a low and/or excess pressure. Thus, removal of distillate can be carried out without interrupting the evaporation process, for example.

Automatic filling and/or automatic removal of the distillate or of residues of the initial substance is possible by controlling the valves and the device for generating a low and/or excess pressure in a coordinated manner by means of a control device. For this purpose, sensors can be provided in the distillate collection container and/or the evaporation flask, which sensors detect, for example, a filling level and are connected to an evaluation unit of the signal detected by the sensors. The control unit is connected to the evaluation unit and controls the valves and the device for generating a low and/or excess pressure in dependence on a sensor signal such as a filling level. The control unit can also be configured to control the rotation motor and/or the heating bath temperature and/or the vertical drive, so that the distillation process can also be carried out automatically.

The invention is not limited to the arrangement of conduit portions and valves shown in FIGS. 2a, 2b and 3. Rather, the conduit portions and valves can also be arranged according to any other suitable arrangement. The conduit portions can also lead directly into the distillate collection container or evaporation flask and thus replace the supply conduit 11 or the distillate conduit 12. In particular, the valves can also be configured as directional control valves, e.g. as 3/2-directional control valves analogous to FIG. 2b. At the conduit portions metering devices for adjusting a volume flow rate can be arranged additionally or instead of the valves.

The storage container 50 shown in FIG. 1 and the peristaltic pump 17 and conduit 51 can also be omitted. In this case the supplied metered amount of the initial substance can be controlled, for example, by means of the volume flow rate through the conduit 11. For example, the valve 15 can be closed again after a predetermined period of time and/or the valve 15 can be suited to set the volume flow rate through the conduit 11.

In the embodiment shown in FIGS. 2a and 2b, three containers each are provided for different components of the initial substance. However, the invention is not limited to this; rather, more or less than three containers for components of the initial substance with suitable conduit portions and valves can also be provided. Likewise, for the separate removal of different distillate components described above with reference to FIG. 3, more or less than three distillate removal containers can also be provided. In doing so, each distillate component can be supplied to a separate removal container. However, it is also possible to feed several distillate components to one removal container or to distribute one distillate component to several removal containers.

The distillate collection container can also be omitted. In this case, the distillate collects, for example, in a lower region of the condenser that is directly connected to the distillate conduit via an outlet.

According to a further development of the invention, it is possible to clean the rotary evaporator 1 described above in a simple manner. A correspondingly modified rotary evaporator and such a method for cleaning the rotary evaporator are described below with reference to FIG. 1. For simplification, only the modifications of the rotary evaporator are given below, components and functions of the rotary evaporator 1 which are the same will not be repeated.

For cleaning the rotary evaporator 1, the supply conduit 11 comprising the valve 15 is not connected to the container 13 containing the initial substance, but to a cleaning agent container not shown in FIG. 1 or the container 13 shown in FIG. 1 is embodied as a cleaning agent container. Likewise, the removal conduit 30 comprising the valve 40 is connected with a residue container 20 for receiving the cleaning agent. At the rotary evaporator 1 shown in FIG. 1, the supply conduit 11 and the removal conduit 30 each extend through the passage 29 of the condenser 4 into the evaporation flask 2 so that the evaporation flask 2 is connected to the containers 13, 20. Alternatively, the container 13 can be connected to the condenser 4 via the supply conduit 11 and/or the residual container 20 can be connected to the condenser 4 via the removal conduit 30. Preferably, the supply conduit 11 for cleaning the rotary evaporator 1 extends through a suitable passage of the condenser (not shown in FIG. 1) in an upper region of the condenser 4 into the condenser 4 and is thus connected to an upper region of the condenser 4.

Preferably a liquid is used as a cleaning agent, in particular water and/or a low-boiling component used in the operation of the rotary evaporator (i.e. a low-volatile or low-boiling component which has been evaporated in a previous operation, i.e. a previous evaporation process) and/or a medium selected according to the rule "similia similibus solvuntur" ("like dissolves in like") and adapted to an initial substance used in the operation of the rotary evaporator or at least one component of the initial substance, and/or a cleaning agent individually tailored to a medium evaporated in the operation of the rotary evaporator, i.e. in an evaporation process. The cleaning agent is thus preferably adapted to an initial substance used in the operation of the rotary evaporator or to at least one component, in particular a component evaporated during operation, of the initial substance.

In order to clean the rotary evaporator 1, the cleaning agent is first introduced into or supplied to the evaporation flask 2 and/or the condenser 4. For this purpose, the valve 16 for the distillate removal and the valve 40 for the removal of the cleaning agent are closed so that the distillate conduit 12 and the removal conduit 30 are shut off. Then a low pressure up to a vacuum is generated by means of the compressor 5 at least within the evaporation flask 2 and the condenser 4 and the valve 15 of the supply conduit 11 is opened. The low pressure sucks the solvent out of the container 13 through the supply conduit 11 into the evaporation flask 2 or the condenser 4. The cleaning agent flows through the evaporation flask 2 and/or the condenser 4, whereby impurities and residues are dissolved from the inner walls of the condenser 5, the vapor passage 18 and the rotation flask 4 and are absorbed in the cleaning agent. The valve 15 is then closed, thus sealing off the supply conduit 11.

In order to remove the solvent, an excess pressure is generated in the evaporation flask 2 and the condenser 4 by means of the compressor 5. Then the valve 40 is opened so that the solvent is displaced from the evaporation flask 2 and the condenser 4 by the excess pressure and passes through the removal conduit 30 into the residual container 20. In this process, the excess pressure is maintained until substantially no cleaning agent is left in the evaporation flask 2 and the condenser 4.

Thus, cleaning of the rotary evaporator is carried out essentially analogously as filling the evaporation flask 4 with the initial substance by means of low pressure and removing rests or residues of the initial substance by means of excess pressure, as described above, except that a cleaning agent is used instead of the initial substance or its rests/residues.

Preferably, the heating bath 3 is switched off during cleaning of the rotary evaporator 1. The rotary drive 7 can also be switched off or can be switched on so that the evaporation flask 2 is caused to rotate. This can further enhance the cleaning effect.

Cleaning of the rotary evaporator 1 is carried out, for example, after an evaporation process described above, in particular after removing the distillate from the collection container 6 and removing initial substance residues from the evaporation flask 2.

The rotary evaporator and the cleaning method can be further developed by the further developments described above with reference to FIGS. 2a, 2b and 3. In particular, one container 21, 22, 23 described with reference to FIG. 2a and/or FIG. 2b can contain the cleaning agent, while another container 21, 22, 23 that does not contain the cleaning agent can contain the initial substance or at least one component of the initial substance.

The invention claimed is:

1. A control unit for a rotary evaporator for evaporating a substance contained in an initial substance, the rotary evaporator having an evaporation flask for receiving the initial substance, a heating device adapted to heat the substance to obtain a vaporized substance, a condenser adapted to condense the vaporized substance to obtain a re-liquefied substance, a collection container adapted to receive the re-liquefied substance and at least one pressure-generating device adapted to generate a low pressure and/or an excess pressure, wherein the control unit is configured and/or programmed to control the rotary evaporator such that an excess pressure is generated at least within the collection container in order to remove the re-liquefied substance and/or an excess pressure is generated at least within the evaporation flask in order to remove residues of the initial substance, wherein the initial substance is a substance mixture of different components and at least two first conduit portions of the rotary evaporator are provided for supplying the initial substance in a metered manner, and wherein the control unit is configured and/or programmed to control shut-off devices of the rotary evaporator provided at and/or between the conduit portions and metering the different components of the initial substance in order to provide for an automatic supply of the initial substance in a metered manner, so that the initial substance is produced in the evaporation flask itself.

2. The control unit according to claim 1, wherein the control unit is configured and/or programmed to control the rotary evaporator such that a low pressure is generated at least within the evaporation flask in order to supply the initial substance in a metered manner.

3. The control unit according to claim 1, wherein at least the evaporation flask, the condenser and the collection container of the rotary evaporator form a substantially gas-tight sealed system.

4. The control unit according to claim 1, the rotary evaporator further comprising a first conduit for supplying the initial substance in a metered manner and/or a second conduit for removing the re-liquefied substance and/or a third conduit for removing the initial substance, wherein the first, second and third conduits have a first, second and third shut-off device respectively, so that the second and third conduits can be shut off by the second and third shut-off devices in order to supply the initial substance in a metered manner and/or so that the first and third conduits can be shut off by the first and third shut-off devices in order to remove the re-liquefied substance and/or so that the first and second conduits can be shut off by the first and second shut-off devices in order to remove the initial substance.

5. The control unit according to claim 4, wherein at least one shut-off device of the rotary evaporator can be operated manually and/or automatically and/or wherein at least one shut-off device is suitable for metering an amount of the substance flowing there through.

6. The control unit according to claim 1, wherein the initial substance is a substance mixture of at least two components, wherein one component is present in the liquid phase or gas phase or solid phase.

7. The control unit according to claim 1, wherein at least two distillate removal containers and/or at least two second conduit portions of the rotary evaporator are provided in order to remove at least two different components of the re-liquefied substance.

8. The control unit according to claim 1, wherein a first conduit and/or a first conduit portion for supplying the initial substance in a metered manner is at least temporarily connected with a distillate removal container of the rotary evaporator.

9. The control unit according to claim 1, wherein the rotary evaporator further comprises at least one storage container for storing at least one component of the initial substance, and a metering device adapted to supply a pre-determined amount of the at least one component of the initial substance from the storage container into a metering container.

10. The control unit according to claim 3, wherein in the gas-tight sealed system, a pressure is adjustable by means of the pressure-generating device.

11. The control unit according to claim 9, wherein the metering device of the rotary evaporator is a peristaltic pump.

12. A control unit for a rotary evaporator for evaporating a substance contained in an initial substance, the rotary evaporator having an evaporation flask for receiving the initial substance, a heating device adapted to heat the substance to obtain a vaporized substance, a condenser adapted to condense the vaporized substance to obtain a re-liquefied substance, a collection container adapted to receive the re-liquefied substance and at least one pressure-generating device adapted to generate a low pressure and/or an excess pressure, wherein the control unit is configured and/or programmed to control shut-off devices of the rotary evaporator provided at and/or between the conduit portions and metering different components of the initial substance and/or the pressure-generating device in order to provide for an automatic supply of the initial substance in a metered manner such that the components of the initial substance are introduced separately metered into the evaporation flask, so that the initial substance is produced in the evaporation flask itself, and wherein the control unit is configured and/or programmed to control shut-off devices of the rotary evaporator and/or the pressure-generating device in order to provide for an automatic removal of residues of the initial substance and/or for an automatic removal of the re-liquefied substance.

* * * * *